(12) United States Patent
Duncan et al.

(10) Patent No.: US 10,703,526 B2
(45) Date of Patent: Jul. 7, 2020

(54) SYSTEM AND METHOD FOR APPLYING TUBULAR SHRINK SLEEVE MATERIAL TO CONTAINERS

(71) Applicant: Axon LLC, Raleigh, NC (US)

(72) Inventors: Adam W. Duncan, Apex, NC (US); Christopher R. Thomas, Raleigh, NC (US)

(73) Assignee: AXON LLC, Raleigh, NC (US)

( * ) Notice: Subject to any disclaimer, the term of this patent is extended or adjusted under 35 U.S.C. 154(b) by 0 days.

(21) Appl. No.: 16/033,997

(22) Filed: Jul. 12, 2018

(65) Prior Publication Data

US 2020/0017251 A1 Jan. 16, 2020

(51) Int. Cl.
| | | |
|---|---|---|
| *B32B 41/00* | (2006.01) | |
| *B65C 9/40* | (2006.01) | |
| *B65C 3/06* | (2006.01) | |
| *B65C 9/00* | (2006.01) | |
| *B29C 63/18* | (2006.01) | |
| *B29C 63/00* | (2006.01) | |
| *B65C 9/02* | (2006.01) | |
| *B29L 31/00* | (2006.01) | |

(52) U.S. Cl.
CPC ............ *B65C 9/40* (2013.01); *B29C 63/0004* (2013.01); *B29C 63/18* (2013.01); *B65C 3/065* (2013.01); *B65C 9/0065* (2013.01); *B65C 9/02* (2013.01); *B29L 2031/712* (2013.01); *B65C 2009/404* (2013.01)

(58) Field of Classification Search
CPC ............................. B65C 9/40; B65C 9/0065; B65C 9/02; B65C 3/065; B65C 2009/404; B29C 63/18; B29C 63/0004; B29L 2031/712
USPC ........................... 156/64, 350, 351, 378, 379
See application file for complete search history.

(56) References Cited

U.S. PATENT DOCUMENTS

| | | | |
|---|---|---|---|
| 4,565,592 A | 1/1986 | Wehrmann | |
| 5,628,574 A | 5/1997 | Crowley | |
| 6,520,080 B1 | 2/2003 | Fried | |
| 7,421,832 B2 | 9/2008 | Lam | |
| 2010/0163154 A1 | 7/2010 | Masuda | |
| 2014/0366487 A1 | 12/2014 | Van Rijsewijk | |
| 2015/0096675 A1* | 4/2015 | Duncan ................... | B65C 3/065 156/256 |
| 2015/0273780 A1 | 10/2015 | Hintraeger | |
| 2017/0142876 A1 | 5/2017 | Kato | |

* cited by examiner

*Primary Examiner* — Michael N Orlando
*Assistant Examiner* — Joshel Rivera
(74) *Attorney, Agent, or Firm* — Thompson Hine LLP

(57) ABSTRACT

A machine for applying tubular film to products includes a film feed path along which a supply of continuous tubular film is fed, and a sleeve eject station at which the film tubing is cut into sleeves that are ejected onto products passing the sleeve eject station. At least one sensor is positioned along the film feed path upstream of the sleeve eject station for detecting a splice in tubular film traveling along the film feed path. A controller is configured for controlling the machine such that, upon detection of a splice in the tubular film, a defective sleeve that includes the splice thereon is ejected into a gap between successive products so as to prevent application of the defective sleeve to any product.

18 Claims, 1 Drawing Sheet

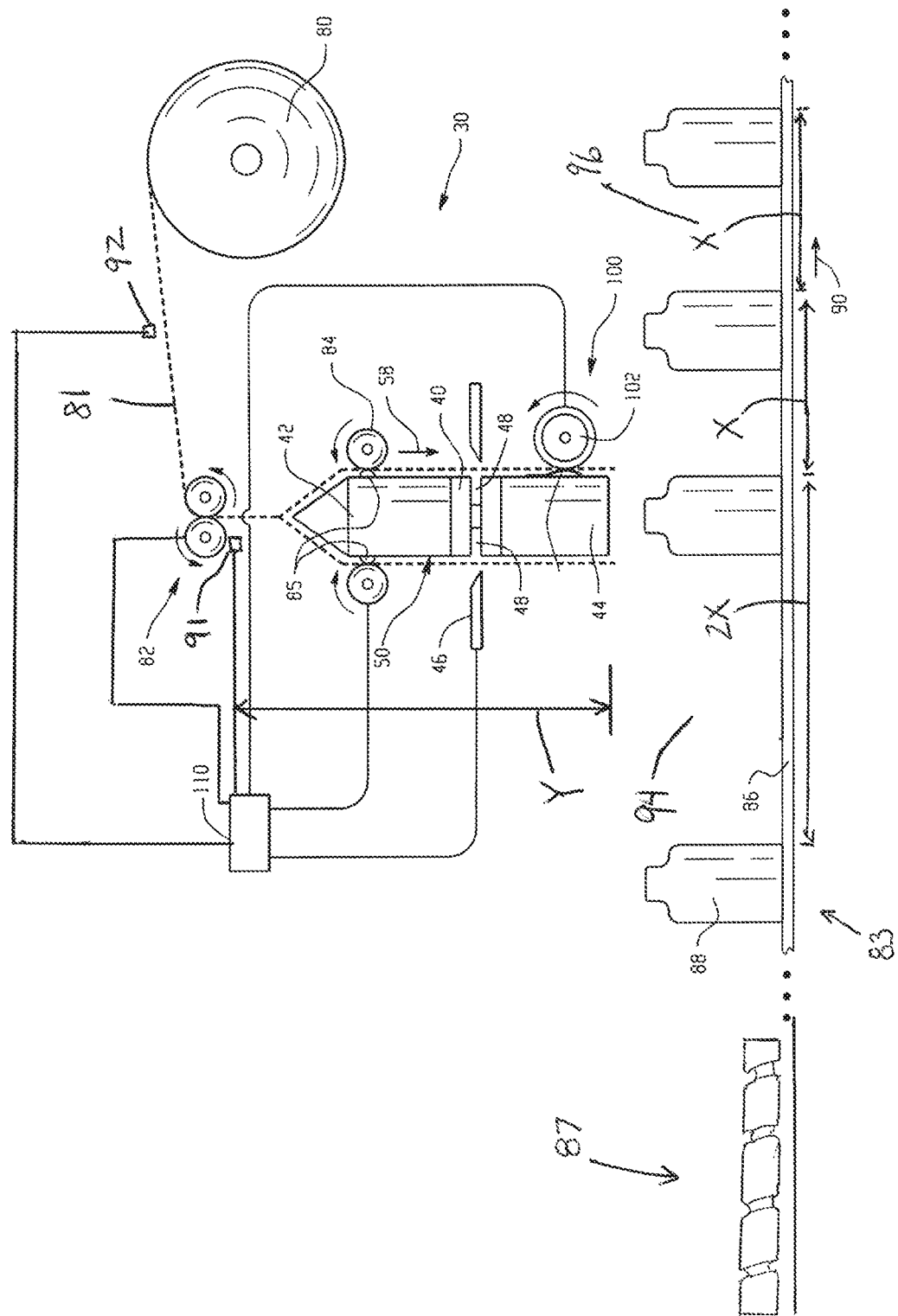

SYSTEM AND METHOD FOR APPLYING TUBULAR SHRINK SLEEVE MATERIAL TO CONTAINERS

TECHNICAL FIELD

The present application relates generally to machines that apply tubular shrink sleeve material to containers and, more particularly, to a system and method for rejecting defective tubular sleeve material from a machine without applying them to containers.

BACKGROUND

Tubular shrink sleeve application devices commonly utilize a mandrel over which a tubular shrink film is moved for cutting, and then the cut sleeve-type label is ejected from the mandrel onto a container located below the mandrel. A downstream application of heat can then be used to shrink the film.

The tubular shrink film is typically provided to the application device in a large roll. As one roll of tubular shrink film is consumed, a replacement roll must be added. This replacement roll is typically spliced to the original roll, but the resulting spliced label is not satisfactory for labeling the products on the assembly line. Traditionally, the products with the resulting defective labels would be manually removed from the pool of labeled products at the end of the assembly line, which is both wasteful and labor intensive.

Therefore, it would be desirable and advantageous to provide a system and method that reduces the effort associated with labels that incorporate a splice.

SUMMARY

In one aspect, a machine for applying tubular film to products includes a film feed path along which a supply of continuous tubular film is fed, and a sleeve eject station at which the film tubing is cut into sleeves that are ejected onto products passing the sleeve eject station. At least one sensor is positioned along the film feed path upstream of the sleeve eject station for detecting a splice in tubular film traveling along the film feed path. A controller is configured for controlling the machine such that, upon detection of a splice in the tubular film, a defective sleeve that includes the splice thereon is ejected into a gap between successive products so as to prevent application of the defective sleeve to any product.

In another aspect, a machine for applying tubular film to products includes a film feed path, a mandrel along the film feed path and about which tubular film is passed, a product conveyance system for moving products past an exit end of the mandrel, a film cutter positioned for cutting the tubular film into sleeves sized for application to products moving past the exit end of the mandrel, a sleeve ejection arrangement for ejecting sleeves from the mandrel and onto products moving past the exit end of the mandrel and at least one sensor positioned along the film feed path for detecting a splice in tubular film traveling along the film feed path. A controller is configured for controlling the product conveyance system and the sleeve ejection arrangement such that, upon detection of a splice in the tubular film, a defective sleeve that includes the splice thereon is ejected from the mandrel while no product is located at the exit end of the mandrel so as to prevent application of the defective sleeve to any product.

In a further aspect, a method of applying cut lengths of film tubing to products as tubular labels involves: (a) feeding a continuous supply of film tubing along a film feed path to a sleeve eject station at which the film tubing is cut into sleeves that are ejected onto products passing the sleeve eject station; (b) sensing a splice in the film tubing at a location along the feed path upstream of the sleeve eject station; and (c) ejecting a defective sleeve that includes the splice into a gap between products passing the sleeve eject station so that the defective sleeve is not applied to any product.

The details of one or more embodiments are set forth in the accompanying drawing and the description below. Other features, objects, and advantages will be apparent from the description and drawing, and from the claims.

BRIEF DESCRIPTION OF THE DRAWINGS

FIG. 1 is a schematic side elevation of one embodiment of a tubular shrink sleeve applying apparatus.

DETAILED DESCRIPTION

An exemplary tubular shrink sleeve applying apparatus 30 is shown in schematic form in FIG. 1 and includes a roll 80 or other supply of tubular film that delivers the film along a film feed path 81 to a pair of tubular film drivers 82 located above the tooling mandrel 50 for moving the film down toward the mandrel. The top of the tooling mandrel is shaped to cause the tubular film to spread from its flat orientation to an expanded orientation as it moves down around the mandrel 50. A set of film drive rollers 84 control feeding of the film downward along the mandrel (e.g., per arrow 58) toward a cutting mechanism 46 that is aligned with a cutting slot 48 in the external surface of the tooling mandrel. Film drivers 84 operate in coordination with drivers 82 and interact with rollers in the sleeve drive slots to move the tubular film downward along the mandrel assembly. A container conveyance system 83 includes a conveyor 86 that passes beneath the lower exit end of the mandrel and carries containers 88 in a conveyance direction 90 such that cut sleeves that are moved off the mandrel assembly slide onto the containers passing thereby. The container conveyance system 83 may also include an upstream container spacing device 87, such as a rotating product feed screw, to provide a set distance X between successive containers moving past the exit end of the mandrel during sleeve application. The cut sleeves may, for example, be ejected off the mandrel with the assistance of a sleeve ejection arrangement 100 made up of one or more ejector wheels 102. A downstream application of heat can then be used to shrink the film. Other variations of the apparatus are possible, including embodiments that do not include the film drivers 82 and embodiments in which other mechanisms for sleeve ejection are provided. For instance, U.S. Pat. App. Pub. No. 2015/0096675, commonly assigned to assignee of the present application, and which is incorporated herein by reference, describes several eject arrangements.

In one embodiment, the tooling mandrel may be of a multi-component type including an upper part 42, lower part 44 and a cutting insert 40 as described in U.S. Pat. No. 8,613,183. Other tooling mandrel and eject arrangement types and configurations are contemplated for use in connection with the innovative sleeve splice detection arrangement of the present application, which is described in detail below.

The various machined components, such as drive rollers 82 and 84, eject roller 102, knife 46, conveyor 86 and product spacer 87 may, for example, be drive by respective servo-motors that enable precise control of speed and position.

A film sensor 91 is located along the film feed path for detecting a splice in tubular film traveling along the film feed path. The sensor could, by way of example and not by way of limitation, be any of a color/contrast sensor (sensing color/contrast change at the splice), a UV sensor, a thickness sensor (the splice being generally thicker than the flat tubular film), a proximity sensor (e.g., sensing foil tape used to form the splice). The sensor 91 is positioned at a known distance Y from the exit end of the mandrel. A controller 110 is configured for controlling the product conveyance system 83, the film feed (82, 84) and the sleeve ejection arrangement (102) such that, upon detection of a splice in the tubular film, a defective sleeve that includes the splice thereon is ejected from the mandrel while no product is located at the exit end of the mandrel, so as to prevent application of the defective sleeve to any product. The defective sleeve can then be blown out of the conveyance path with a puff of air or could simply fall into a collection area below the conveyance path (e.g., through a small gap in the conveyance path).

By way of example, because the distance Y is known and the film travel speed and distance are known, the controller 110 may identify a number sleeve cut and eject operations that will occur before the splice reaches the exit end of the mandrel. The controller 110 can then pause or slows down the product conveyance system 83 to provide a product free space 94 at the exit end of the mandrel when the defective sleeve is ejected. Where the product conveyance system 83 includes a product spacing mechanism 87, the product free space may be defined by an increased distance between successive products, such as distance 2X, or some other integer multiple of the set distance X. In other implementations product convey and/or fill feed and eject can be controlled to eject the defective sleeve into an existing empty space 96 between products.

In some implementations, such as where high speed application of sleeves necessitates it, the controller may be configured such that, upon detection of the splice in the tubular film, the film feed assembly (e.g., 82, 84) is adjusted to reduce a feed rate of the film along the feed path from a standard feed rate to a reduced feed rate, and the container conveyance system is similarly adjusted to reduce a conveyance rate of containers past the exit end of the mandrel from a normal conveyance rate to a reduced conveyance rate. In particular, the controller 110 may reduce the film feed rate from a normal feed rate to the reduced feed rate and reduce the conveyance rate from the normal conveyance rate to the reduced conveyance rate. The controller 110 also identifies a number sleeve eject operations that will occur before the splice reaches the exit end of the mandrel and pauses or further slows the product conveyance system to provide a product free space 94 at the exit end of the mandrel when the defective sleeve is ejected. After ejection of the defective sleeve, the controller 110 then increases the feed rate from the reduced feed rate back to the normal feed rate and increases the conveyance rate from the reduced conveyance rate back to the normal conveyance rate.

In some systems, an optional additional film splice sensor 92 may be provided upstream of sensor 91 on the film feed path 81. In such systems, the controller 110 may be configured such that: upon detection of the splice by the 92 sensor, the controller reduces the film feed rate from the normal feed rate to the reduced feed rate and reduces the container conveyance rate from the normal conveyance rate to the reduced conveyance rate. Upon detection of the splice by the sensor 91, the controller identifies a number sleeve eject operations that will occur before the splice reaches the exit end of the mandrel and pauses or further slows the product conveyance system 83 to provide a product free space at the exit end of the mandrel when the defective sleeve is ejected. After ejection of the defective sleeve, the controller 110 increases the film feed rate from the reduced feed rate back to the normal feed rate and increases the conveyance rate from the reduced conveyance rate back to the normal conveyance rate.

As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carries out the control functions of the tubular shrink sleeve applying apparatus or the control functions of any component thereof.

Thus, the above described embodiments provide an advantageous method of applying tubular film sleeves onto containers by moving tubular film from a supply of tubular film over a mandrel assembly including a film cutter for cutting the tubular film to produce a tubular film sleeve sized for application to a container passing below the mandrel assembly. Where one supply of tubular film is joined to another supply of tubular film, resulting in a spliced section, the embodiments described above allow for the advantageous detection and omission of the spliced section/defective sleeve from the production line. Thus, there is no need for manual removal of defectively labeled products, because there are no defectively labeled products, and there is no waste of defectively labeled products.

It is to be clearly understood that the above description is intended by way of illustration and example only, is not intended to be taken by way of limitation, and that other changes and modifications are possible. For example, while containers are primarily discussed above, the sleeves could be ejected onto other types of products as well.

What is claimed is:

1. A machine for applying tubular film to products, the machine including:
   a film feed path;
   a mandrel along the film feed path and about which tubular film is passed;
   a product conveyance system for moving products past an exit end of the mandrel;
   a film cutter positioned for cutting the tubular film into sleeves sized for application to products moving past the exit end of the mandrel;
   a sleeve ejection arrangement for ejecting sleeves from the mandrel and onto products moving past the exit end of the mandrel;
   at least one sensor positioned along the film feed path for detecting a splice in tubular film traveling along the film feed path; and
   a controller configured for controlling the product conveyance system and the sleeve ejection arrangement such that, upon detection of a splice in the tubular film, a defective sleeve that includes the splice thereon is ejected from the mandrel while no product is located at the exit end of the mandrel so as to prevent application of the defective sleeve to any product.

2. The machine of claim 1 wherein the controller is configured such that, upon detection of the splice in the tubular film, the product conveyance system is paused or slowed down to provide a product free space into which the defective sleeve is ejected.

3. The machine of claim 2 wherein the product conveyance system includes a product spacing mechanism and the product free space is defined by an increased distance between successive products.

4. The machine of claim 1 wherein the controller is configured to operate the product conveyance system to provide a set distance between successive products moving past the exit end of the mandrel during sleeve application and, upon detection of the splice in the tubular film, to change operation of the product conveyance system to provide a splice distance between at least two successive products, wherein the splice distance is greater than the set distance and provides a product free space into which the defective sleeve is ejected.

5. The machine of claim 4 wherein the controller is configured such that the splice distance is an integer multiple of the set distance.

6. The machine of claim 1 wherein the controller is configured such that, upon detection of the splice in the tubular film, a film feed assembly is adjusted to reduce a feed rate of the film along the feed path from a standard feed rate to a reduced feed rate and the product conveyance system is adjusted to reduce a conveyance rate of products past the exit end of the mandrel from a normal conveyance rate to a reduced conveyance rate.

7. The machine of claim 6 wherein the at least one sensor includes a first sensor positioned along the film feed path and a second sensor positioned along the film feed path at a location downstream of the first sensor, and the controller is configured such that:
    upon detection of the splice by the first sensor, the controller reduces the feed rate from the normal feed rate to the reduced feed rate and reduces the conveyance rate from the normal conveyance rate to the reduced conveyance rate,
    upon detection of the splice by the second sensor, the controller identifies a number sleeve eject operations that will occur before the splice reaches the exit end of the mandrel and pauses or further slows the product conveyance system to provide a product free space at the exit end of the mandrel when the defective sleeve is ejected,
    after ejection of the defective sleeve, the controller increases the feed rate from the reduced feed rate back to the normal feed rate and increases the conveyance rate from the reduced conveyance rate back to the normal conveyance rate.

8. The machine of claim 6 wherein the controller is configured such that, upon detection of the splice, the controller:
    reduces the feed rate from the normal feed rate to the reduced feed rate and reduces the conveyance rate from the normal conveyance rate to the reduced conveyance rate,
    identifies a number sleeve eject operations that will occur before the splice reaches the exit end of the mandrel and pauses or further slows the product conveyance system to provide a product free space at the exit end of the mandrel when the defective sleeve is ejected, and
    after ejection of the defective sleeve, the controller increases the feed rate from the reduced feed rate back to the normal feed rate and increases the conveyance rate from the reduced conveyance rate back to the normal conveyance rate.

9. A machine for applying tubular film to products, the machine including:
    a film feed path along which a supply of continuous tubular film is fed;
    a sleeve eject station at which the film tubing is cut into sleeves that are ejected onto products passing the sleeve eject station;
    at least one sensor positioned along the film feed path upstream of the sleeve eject station for detecting a splice in tubular film traveling along the film feed path; and
    a controller configured for controlling the machine such that, upon detection of a splice in the tubular film, a defective sleeve that includes the splice thereon is ejected into a gap between successive products so as to prevent application of the defective sleeve to any product.

10. The machine of claim 9 wherein the controller is configured such that, upon detection of the splice in the tubular film, a product conveyance system is paused or slowed down to provide a product free space into which the defective sleeve is ejected.

11. The machine of claim 10 wherein the product conveyance system includes a product spacing mechanism and the product free space is defined by an increased distance between successive products.

12. A method of applying cut lengths of film tubing to products as tubular labels, the method comprising:
    (a) feeding a continuous supply of film tubing along a film feed path to a sleeve eject station at which the film tubing is cut into sleeves that are ejected onto products passing the sleeve eject station;
    (b) sensing a splice in the film tubing at a location along the feed path upstream of the sleeve eject station; and
    (c) ejecting a defective sleeve that includes the splice into a gap between products passing the sleeve eject station so that the defective sleeve is not applied to any product.

13. The method of claim 12 wherein a feed rate of the continuous supply of film tubing and a conveyance rate of the products are coordinated.

14. The method of claim 13 wherein the feed rate and the conveyance rate are both slowed prior to ejecting the defective sleeve.

15. The method of claim 14 wherein the feed rate and the conveyance rate are both increased after ejecting the defective sleeve.

16. The method of claim 12 wherein a product conveyance rate is at least paused or slowed to provide the gap between products.

17. The method of claim 12 wherein a product spacing mechanism is controlled to increase a spacing between successive products in order to provide the gap between products.

18. The method of claim 12 wherein step (b) involves utilizing at least one sensor located along the film feed path at a known distance from an eject point of the sleeve eject station.

* * * * *